United States Patent [19]
Carroll et al.

[11] Patent Number: 5,517,188
[45] Date of Patent: May 14, 1996

[54] PROGRAMMABLE IDENTIFICATION APPARATUS AND METHOD THEREFOR

[76] Inventors: Gary T. Carroll, 4260 Blackcherry Ct., Boulder, Colo. 80301; J. Donald Pauley, Panorama Dr., Estes Park, Colo. 80517

[21] Appl. No.: 201,005

[22] Filed: Feb. 24, 1994

[51] Int. Cl.⁶ ............................. H04Q 3/02; H04Q 9/16; G08C 19/16; G08B 1/08
[52] U.S. Cl. ............................. 340/825.54; 340/825.65; 340/505; 455/38.2
[58] Field of Search ............................. 340/505, 825.54, 340/825.55, 825.65, 825.69; 455/54.2, 38.1, 38.2

[56] References Cited

U.S. PATENT DOCUMENTS

| | | | |
|---|---|---|---|
| 4,177,453 | 12/1979 | Collins | 340/825.65 |
| 5,070,500 | 12/1991 | Horinouchi et al. | 340/825.54 |
| 5,214,409 | 5/1993 | Beigel | 340/825.54 |
| 5,245,332 | 9/1993 | Katzenstein | 340/825.54 |
| 5,257,011 | 10/1993 | Beigel | 340/825.54 |
| 5,376,932 | 12/1994 | Samokine et al. | 340/825.54 |

*Primary Examiner*—Alyssa H. Bowler
*Assistant Examiner*—Mark H. Rinehart
*Attorney, Agent, or Firm*—Robert H. Kelly; Holland & Hart

[57] ABSTRACT

A programmable identification apparatus, and associated method, includes a transceiver and a transponder. The transponder is powered by the energy of a transceiver transmit signal generated by the transceiver and includes a programmable memory element. A coded sequence which uniquely identifies the transponder is stored in the programmable memory element and, when the transponder is powered, the transponder generates a transponder signal which includes the coded sequence stored in the programmable memory element, once modulated by circuitry of the transponder. When the transceiver transmit signal generated by the transceiver circuitry is of certain signal characteristics, the coded sequence stored in the programmable element is erased, and a substitute coded sequence, which also forms a portion of the transceiver transmit signal, is stored in the programmable memory element. Storage of the coded sequence in the programmable memory element is, hence, effectuated merely by application of a transceiver transmit signal of certain characteristics to the transponder.

8 Claims, 5 Drawing Sheets

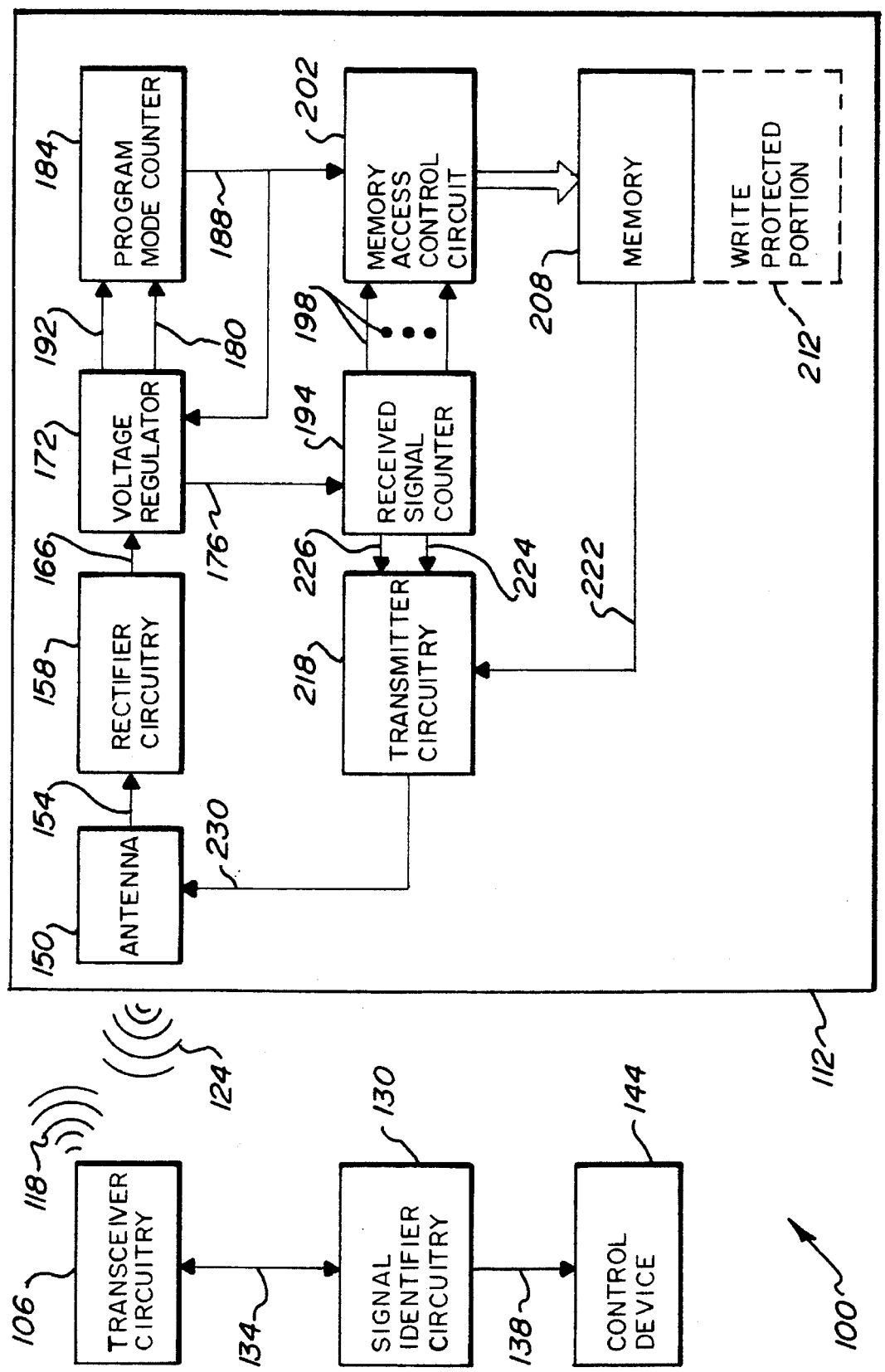

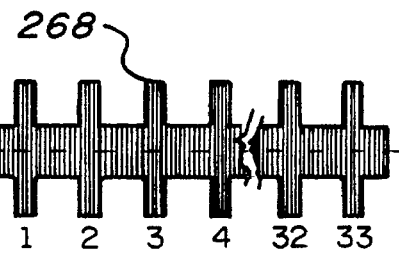
Fig._2
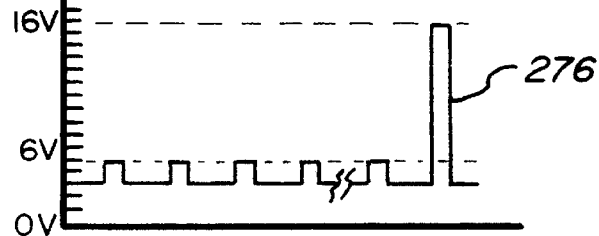
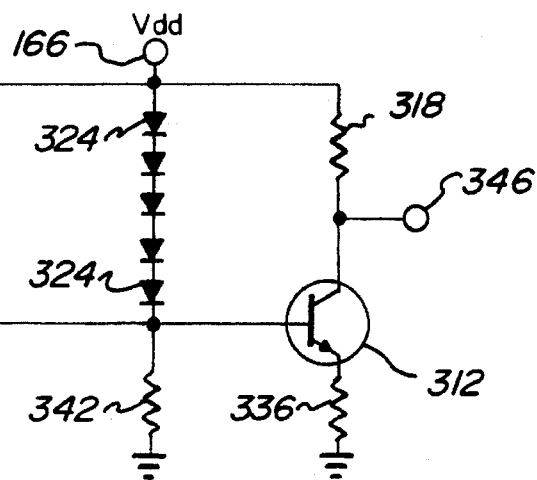
Fig._3A
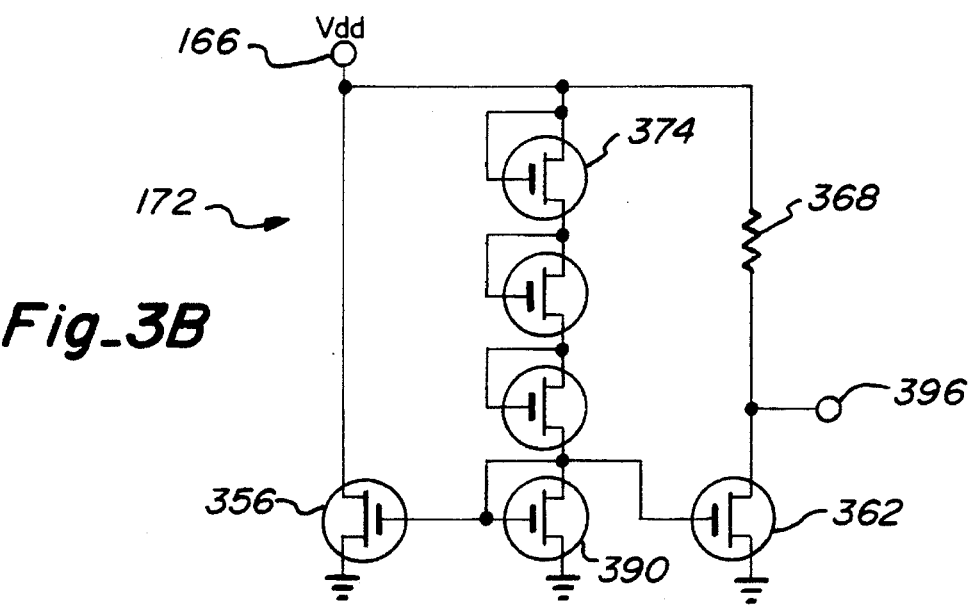
Fig._3B

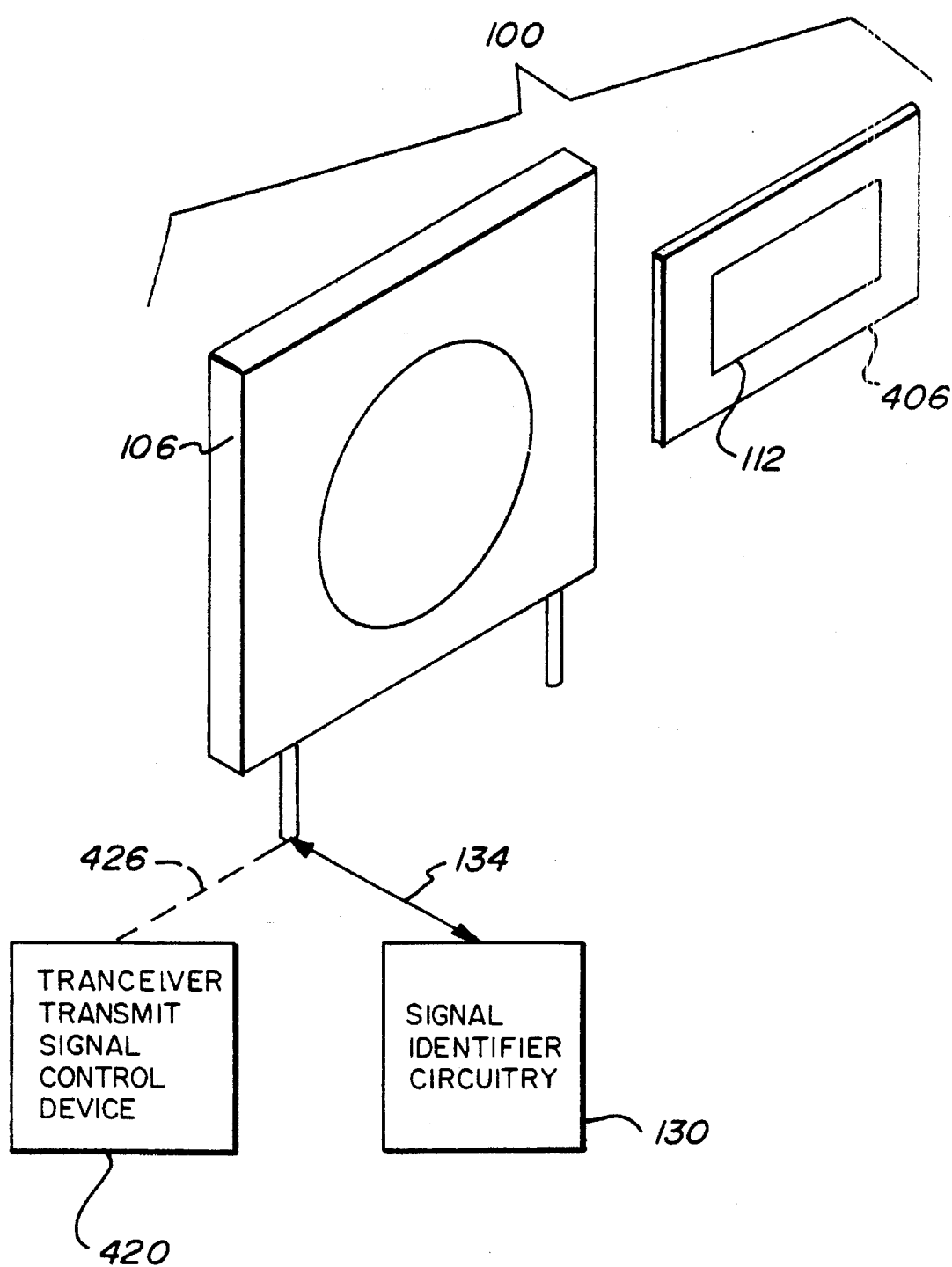
Fig_4

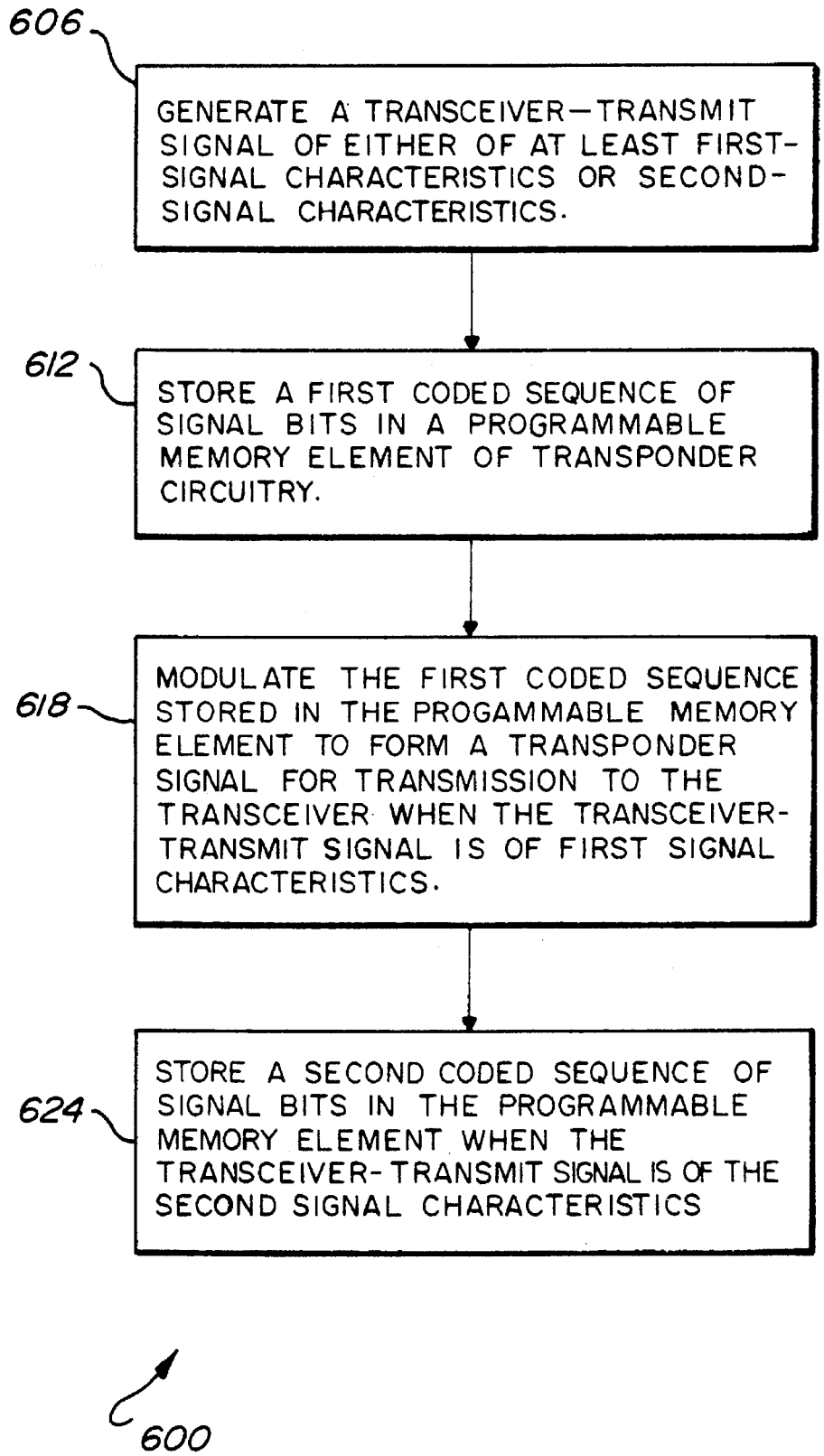
Fig_6

PROGRAMMABLE IDENTIFICATION APPARATUS AND METHOD THEREFOR

The present invention relates generally to identification apparatus having a transponder which generates a signal responsive to reception of a signal transmitted thereto by a transceiver. More particularly, the present invention relates to an identification apparatus having a transponder including a programmable memory for storing a coded sequence which uniquely identifies the transponder and which is programmably responsive to reception of selected signals.

BACKGROUND OF THE INVENTION

Identification ("ID") apparatus and methods are used in many varied applications including, for instance, in locator systems, monitoring systems, and security systems. Most of these systems associate a unique code with a particular person or object which is to be identified. The ID apparatus is typically carried by or affixed to the person or object, which either displays or otherwise indicates the unique code associated with the person or object.

Existing identification apparatus and methods oftentimes utilize radio frequency signals in which the unique code is utilized to develop a modulated signal which uniquely identifies the person or object. In these applications, a signal generator is carried by or affixed to the person or object identified by the unique code, and a modulated signal is generated to identify the person or object. Receiver circuitry positioned to receive the modulated signal generated by the signal generator identifies the person or object associated with the unique code once the modulated signal is received and demodulated.

In some instances, the receiver circuitry comprises transceiver circuitry operative both to generate modulated signals and to receive modulated signals, and the signal generator comprises transponder circuitry operative to generate the modulated signal responsive to times in which modulated signals generated by the transceiver circuitry are received by the transponder circuitry.

Transponder circuitry formed of circuitry capable of low power level operation can be powered by the energy of the particular radio frequency signals transmitted thereto by a transmitter. When the particular radio frequency signal is received by the transponder, circuitry of the transponder converts the energy of the received radio frequency signal into a form suitable for powering the various control and logic functions as well as the transmitter circuitry of the transponder. As the transponder circuitry is powered by the energy of the particular radio frequency signal, the transponder modulates the radio frequency carrier signal with a unique code only when the transponder is positioned to receive the signal transmitted thereto, and the signal transmitted thereto is greater than a predetermined threshold energy level.

The unique code associated with a particular object or person is stored in the circuitry of the transponder. In some instances, the unique code is stored in the circuitry of the transponder by forming specific circuit connections which make up the unique code. For instance, fused connections may be established with a laser device to form a unique code word. Alternatively, a memory element, such as an electrically programmable read only memory ("EPROM"), may be programmed to store the unique code.

Such existing techniques require that the unique code be stored or programmed during assembly of the transponder. Customization of the transponder circuitry for particular needs is therefore somewhat difficult as the unique code must be known at the time of the assembly of the transponder circuitry. Accordingly, when the transponder circuitry of the electronic identification apparatus needs to be customized or adapted for a particular purpose, the customization cannot occur at a retail level. Additionally, once the unique code is stored in the transponder circuitry, alteration can be effectuated, if at all, only with significant effort. Utilizing existing techniques, storage of a substitute code in the transponder circuitry requires reassembly of the transponder circuitry.

It is with respect to these considerations and other background information relative to existing identification apparatus that the significant improvements of the present invention have evolved.

SUMMARY OF THE INVENTION

The present invention advantageously provides an identification apparatus having a transponder including a programmable memory for storing a coded sequence therein. When the transponder is powered, the transponder modulates a carrier signal with a coded sequence to generate a modulated signal which uniquely identifies the transponder. Because the coded sequence is stored in a programmable memory, the values of the coded sequence may be altered. A transceiver is operative to generate signals for transmission to the transponder and to receive the modulated signal generated by the transponder. The transponder may be powered by the energy of the signal generated by the transceiver when the signal, when received by the transponder, is greater than a first threshold level. When the signal generated by the transceiver has a first signal characteristic, the transponder is operative to generate a modulated signal including the coded sequence stored in the programmable memory. When the signal generated by the transceiver is of a selected, second signal characteristic, the coded sequence stored in the programmable memory is replaced with a coded sequence contained in the signal generated by the transceiver. In this manner, by applying a signal of selected characteristics to the transponder, any desired coded sequence may be stored in the transponder programmable memory to customize the service at a retail level.

The transponder may, therefore, be customized at any time merely by proper application of a signal of selected characteristics and it need not be customized only during assembly. That is to say, radio frequency, noncontact programming of the transponder by factory personnel or customers is possible to permit the customization of the transponder.

In accordance with the present invention, a programmable identification apparatus is provided which includes a transceiver operative to generate a transmit signal. The transmit signal is alternatively of at least first signal characteristics and of second signal characteristics. The transceiver is also operative to receive a transponder signal transmitted thereto. A transponder has transponder circuitry which may be powered by the transmit signal generated by the transceiver. A programmable memory element in the transponder stores a first coded sequence of signal bits therein. The transponder is operable to modulate a carrier signal with the first coded sequence of signal bits stored in the programmable memory element to form the transponder signal for transmission to the transceiver when the transmit signal generated by the transceiver is of the first signal characteristics. The transponder is also operable to store a second coded sequence in the programmable memory element when the transmit signal generated by the transceiver is of the second signal characteristics.

A more complete appreciation of the present invention and its scope can be obtained from the accompanying drawings, which are briefly summarized below, the following detailed description of presently preferred embodiments of the invention, and the appended claims.

BRIEF DESCRIPTION OF THE DRAWINGS

FIG. 1 is a functional block diagram of the programmable identification apparatus of an embodiment of the present invention.

FIG. 2 is a graphical representation of a signal transmitted by the transceiver circuitry of the programmable identification apparatus shown in FIG. 1 transmitted to the transponder circuitry of the programmable identification apparatus and of signals generated during operation of the transponder circuitry responsive to times in which the signal transmitted by the transceiver circuitry is received by the transponder circuitry.

FIG. 3A is a circuit schematic of a voltage regulator which forms a portion of the transponder of the programmable identification apparatus shown in FIG. 1 of one embodiment of the present invention.

FIG. 3B is a circuit schematic of an alternative embodiment of a voltage regulator which forms a portion of the transponder of the programmable identification apparatus shown in FIG. 1.

FIG. 4 is a simplified isometric view of the transceiver and transponder of the programmable identification apparatus shown in FIG. 1, here positioned transmit signals therebetween.

FIG. 6 is a logical flow diagram listing the steps of a method of an embodiment of the present invention.

DETAILED DESCRIPTION

Figure 5:
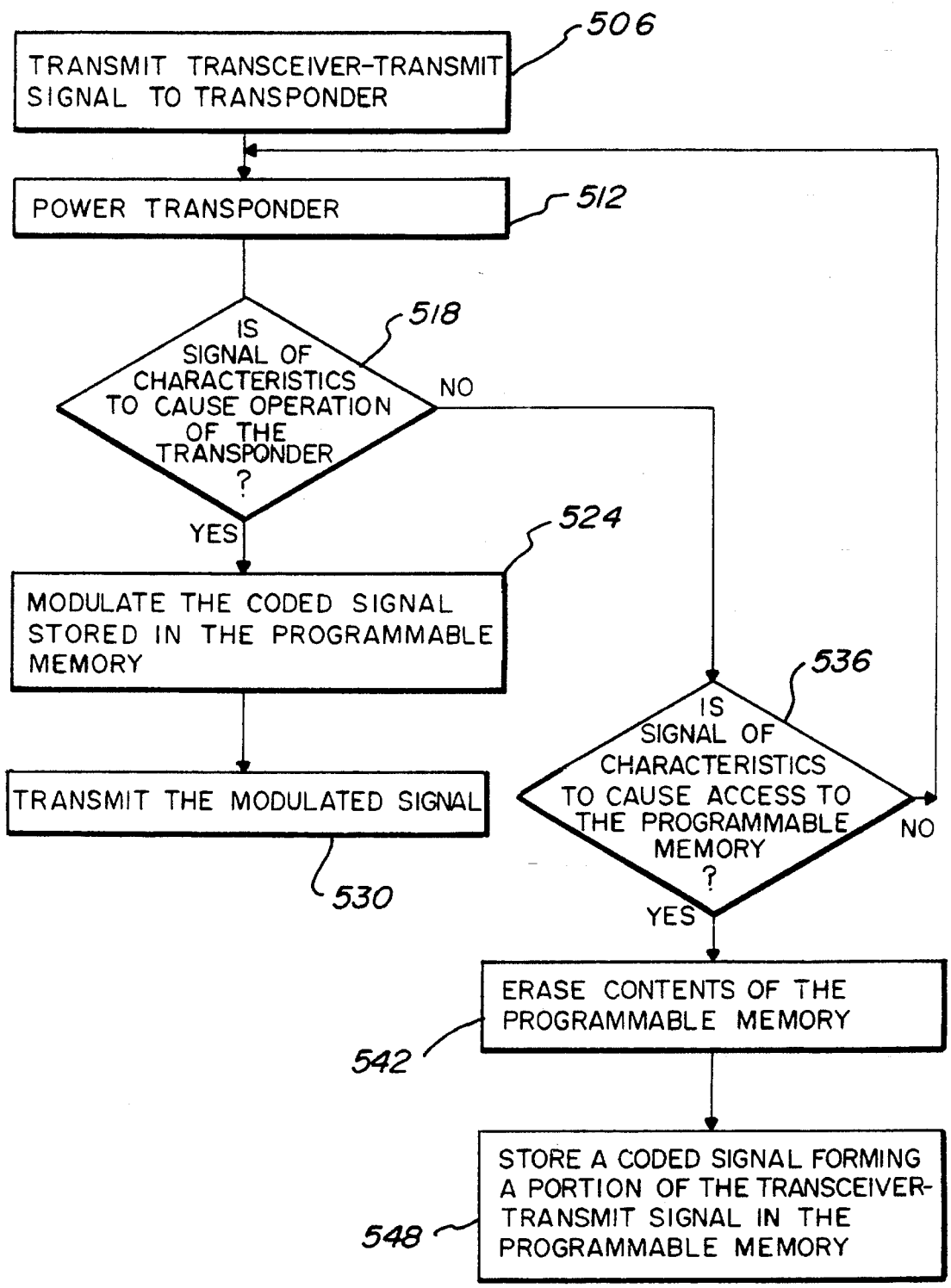
FIG. 5 is a logical flow diagram illustrating operation of the programmable identification apparatus shown in FIG. 1.

Referring first to FIG. 1, a programmable identification apparatus, referred to generally by reference numeral 100, is shown. The programmable identification apparatus 100 includes transceiver circuitry 106 and a transponder 112 comprising transponder circuitry made up of a number of analog and digital logic blocks. The transceiver circuitry 106 is operative to generate and transmit transceiver transmit signals such as the transceiver transmit signal 118 (an amplitude modulated signal) to the transponder 112, and the transponder is operative to generate transponder signals such as the transponder signal 124 for transmission to the transceiver circuitry 106 responsive to times in which the transceiver transmit signals 118 are received by the transponder 112 and are of energy levels greater than a predetermined threshold energy level.

Signal identifier circuitry 130 is coupled to the transceiver circuitry 106 by means of line 134 to receive signals representative of the transponder signal 124 received by the transceiver circuitry 106. The signal identifier circuitry 130 is operative to identify the signal generated on line 134 and then to generate a control signal on line 138 for application to a control device 144 when the signal applied to the identifier circuitry 130 comprises particular signal values. The control device 144 may, for example, comprise a relay which, when energized responsive to the control signal generated on line 138 by the signal identifier circuitry 130, cause a door of an entryway to be unlocked to permit opening of the door. The control signal generated on line 138 may, of course, be applied to other control devices 144 and be utilized for other purposes.

The transponder circuitry of the transponder 112 includes an antenna 150 operative to receive the transceiver transmit signal 118 generated by the transceiver circuitry 106. The transceiver transmit signal 118, an amplitude modulated signal, once received by the antenna 150, is converted into electrical form and a signal representative thereof is generated on line 154 and applied to rectifier circuitry 158. The rectifier circuitry 158 rectifies the signal applied thereto and generates a rectified signal on line 166 which is applied to a voltage regulator 172.

The voltage regulator is operative to regulate the voltage level of the rectified signal applied thereto. When the voltage level of the signal applied to the regulator 172 on line 166 is greater than a predetermined threshold value, the voltage regulator 172 clamps the value of the rectified signal generated on line 166 and generates a voltage regulated signal on line 176. A signal is generated on line 180 each time in which the voltage regulator 172 clamps the voltage of the signal applied thereto on line 166.

Line 180 is coupled to a program mode counter 184 which counts times in which the voltage regulator 172 generates a signal on line 180. When the voltage regulator generates a signal on line 180 a successive number of times, such as, for example, thirty-two times, the program mode counter 184 counts out, and the program mode counter 184 generates a signal on line 188. The voltage regulator 172 also generates a signal on line 192 to reset the program mode counter 184 when the voltage regulator 172 does not successively clamp the signal applied thereto on line 166.

The signal generated by the voltage regulator 172 on line 176 is applied to a received signal counter 194. The received signal counter 194 counts times in which the signal generated by the regulator 172 is of particular signal values. Counter outputs of the counter 194 include outputs generated on lines 198 which are applied to a memory access control circuit 202. Line 188 coupled to the output of the program mode counter 184 is further coupled to the memory access control circuit 202.

The memory access control circuit 202 is operative to permit access to memory locations of an array of memory locations of a programmable memory 208 when signals are generated on selected ones of the lines 198 and line 188. The programmable memory 208 is a nonvolatile memory and, in the embodiment illustrated in the figure, also includes a memory portion 212 which may be selectably made to be write-protected. Values of signals generated upon selected ones of the lines 188 and 198 are determinative of whether the memory portion 212 is selected to be write-protected.

The programmable memory 208 is operative to store therein a coded sequence of signal bits, the values of which permit unique identification of the transponder 112.

The programmable memory 208 is coupled to transmitter circuitry 218 by way of line 222. Connection of the transmitter circuitry 218 with the memory 208 permits the coded sequence stored in the memory 208 to be accessed by the transmitter circuitry 218. The transmitter circuitry 218 is operative to modulate a carrier signal with the coded sequence stored in the memory 208 and to supply the modulated signal formed thereby on line 230 to the antenna 150. The antenna 150 transmits the modulated signal which forms the transponder signal 124 for transmission to the transceiver circuitry 106. The transmitter circuitry 218 is operative to modulate a carrier signal with the coded sequence stored in the memory 208 by gating stored values therein with signals generated on lines 224 and 226 coupled to counter outputs of the received signal counter 194. Because the counter output of the received signal counter 194 is related to the frequency of the transceiver transmit signal 118, the modulated signal formed by the transmitter circuitry 218 is similarly related to the frequency of the transceiver transmit signal 118. For instance, when line 226 is coupled to the most significant counter output of the received signal counter 194, the modulated signal generated by the transmitter circuitry 218 is one half of the frequency of the transceiver transmit signal 118.

In the embodiment illustrated in FIG. 1, the transponder 112 does not include a power supply to power the elements of the transponder circuitry which is powered by the energy of the transceiver transmit signal 118 generated by the transceiver circuitry 106 and received by the transponder 112. The transponder 112 is thereby operative only during times in which the transceiver transmit signal 118 is received by the transponder 112 and is of a power level which permits powering of the circuitry of the transponder 112 with the energy of the signal 118. Because the transponder 112 need not be powered by a battery power supply, the space required of the transponder 112 and the resultant weight of the transponder 112 is minimized. Alternatively, the transponder 112 may include an onboard power source such as a battery.

Because the programmable memory 208 of the transponder 112 is accessible by application of signals on selected ones of the lines 198 and the line 188 (through memory access control circuit 202), and because the values of the signals generated on the various ones of the lines 198 are determined by the values of the transceiver transmit signal 118 received by the transponder 112, access to the programmable memory 208 may be obtained by proper selection of the values of the transceiver transmit signal 118 generated by the transceiver circuitry 106.

Once access is obtained to the programmable memory 208, the values of the coded sequence stored in the memory locations of the memory 208 may be erased and a substitute coded sequence may be stored in the memory. In such manner, the coded sequence which uniquely identifies the transponder 112 may be altered. Storage of the sequence to uniquely identify the transponder 112 need not occur during assembly of the transponder 112 as the coded sequence may be altered merely by causing the transceiver transmit signal 118 generated by the transceiver circuitry 106 to be of particular signal values and by positioning the transponder 112 within the proximity of the transceiver circuitry 106 to receive the transceiver transmit signal 118.

When the transceiver transmit signal 118 generated by the transceiver circuitry 106 is of signal values other than the particular signal values which cause the memory access control circuit 202 to access the programmable memory 208, values of an ID bit sequence stored in the memory 208 are not altered. If the transceiver transmit signal 118 is of a great enough energy level, the transponder 112 is powered to generate a transponder signal 124 directly related to the coded sequence stored in the memory 208. When the transceiver circuitry 106 receives the transponder signal 124, the signal identifier circuitry 130 identifies the signal received by the transceiver circuitry 106 and generates a control signal on line 138 which is coupled to control the control device 144.

FIG. 2 is a graphical representation which represents plots of signals representing voltage levels of signals formed as functions of time during the operation of the programmable identification apparatus 100 shown in FIG. 1. The waveform 268 plotted at the top portion of the figure is representative of the transceiver transmit signal 118 generated by the transceiver circuitry 106 of the programmable identification apparatus 100 when the transceiver transmit signal 118 is of characteristics to cause the memory access control circuit 202 to access the memory 208. Namely, the transceiver transmit signal 118 is modulated to form a signal with an envelope generally of three volts, but which has voltage spikes of values which are greater than the values at which the voltage regulator 172 of the transponder 112 becomes operative to clamp the signal applied thereto. For instance, in one embodiment of the present invention, the voltage regulator 172 is operative to clamp signals in excess of six volts. The voltage spikes of the waveform 268 representative of the transceiver transmit signal 118 generated by the transceiver circuitry 106 are of values in excess of six volts, and, here, the voltage spikes of the waveform 268 are of values of sixteen volts.

The waveform 276 plotted at the bottom portion of the figure is representative of the signal generated on line 176 by the voltage regulator 172 of the transponder 112. The waveform 276 is of a value corresponding to the value of the waveform 268 when the envelope of the waveform 268 is less than the voltage at which the voltage regulator 172 clamps the value of the signal applied thereto. Accordingly, when the envelope of the waveform 268 is of the three volt level, the signal 176 generated by the voltage regulator 172 is of the three volt level. And, when the envelope of the waveform 268 is of values greater than the value at which the voltage regulator is operative to clamp the voltage of the signal applied thereto, the signal generated on line 176 is clamped, here at a value of six volts. When the transceiver transmit signal 118 generated by the transceiver includes successive numbers of voltage spikes which cause the voltage regulator 172 to clamp the value of the signal applied thereto, the program mode counter 184 of the transponder 112 counts out and the voltage regulator 172 terminates clamping of the signal applied thereto. The signal generated on line 176 is thereafter of a value, here sixteen volts, corresponding to the energy level of the waveform 268.

In the embodiment shown in FIG. 1, the program mode counter 184 counts out when the voltage regulator 172 is operative to clamp the value of the signal applied thereto thirty-two times. Thereafter, the voltage regulator 172 terminates clamping of the signal applied thereto. And, as noted previously, when the program mode counter 184 counts out, the signal generated on line 188 and also signals generated on various ones of the lines 198 cause the memory access control circuit 202 to access the memory 208 to erase the contents stored in the programmable memory 208 and to store a substitute coded sequence in the memory.

Values of the transceiver transmit signal 118 subsequent to the portion of the signal having the successive numbers of voltage spikes which cause the program mode counter 184 to count out form the values of the sequence which is stored in the memory 208. Once the substitute sequence of the coded signal is stored in the memory, the transponder 112 is thereafter operative to modulate the coded sequence stored in the memory 208 to form the transponder transmit signal 124 for generation to the transceiver circuitry 106 whenever the transponder 112 is positioned to receive the transceiver transmit signal 118 to be powered therefrom.

FIG. 3A illustrates the voltage regulator 172 of the transponder 112 of the programmable identification apparatus 100 of one embodiment of the present invention. In the embodiment illustrated in FIG. 3A, the voltage regulator 172 includes a pair of bipolar junction transistors 306 and 312 which are commonly connected at base terminals thereof and which have collector terminals which are coupled to receive a signal applied thereto on line 166. The collector terminal of the transistor 312 is coupled to line 166 through a resistor 318. Line 166 is also coupled to the base electrodes of the transistors 306 and 312 through a plurality of diodes 324, here five diodes 324. The emitter electrode of the transistor 306 is coupled to ground through a resistor 330; the emitter electrode of the transistor 312 is coupled to ground through a resistor 336; and the base electrodes of the transistors 306 and 312 are coupled to ground through a resistor 342. The voltage regulator 172 forms a switch having an output 346 at the collector electrode of the transistor 312 which is normally high when the voltage regulator is not clamping the level of the signal applied thereto. When the signal level of the signal applied on line 166 is of a level to cause the voltage regulator to clamp the value of the signal applied thereto, the switch formed of the transistor pair 306 and 312 turns on, and an indication is generated at the output 346 which is applied to the program mode counter 184 shown in FIG. 1.

FIG. 3B illustrates a voltage regulator 172 of the transponder 112 of the programmable identification apparatus of another embodiment of the present invention. The voltage regulator again includes a pair of transistors, here MOSFET transistors 356 and 362. First terminals of the transistors 356 and 362 are coupled to the line 166 with the first electrode of the transistor 362 being coupled to the line 166 through a resistor 368. Gate electrodes of the transistors 356 and 362 are further coupled to the line 166 through a series of transistors 374, here three transistors 374. Second electrodes of the transistors 356 and 362 are coupled to ground and the gate electrodes of the transistors 356 and 362 are coupled to ground through a transistor 390. The transistors 374 are operative to generate an internal reference voltage which is applied to the gate electrodes of both transistors 356 and 362. When the voltage of the signal generated on line 166 is below the threshold level which causes the voltage regulator 172 to clamp the value of the signal applied thereto, the transistors 356 and 362 are turned off. But, when the value of the signal applied on line 166 is above the threshold level of the voltage regulator 172, the transistors 356 and 362 turn on and the voltage of the signal generated on line 166 is clamped at the threshold level of the voltage regulator and the value of the output on line 396 indicates such voltage regulation.

FIG. 4 is a simplified isometric view of the programmable identification apparatus 100 wherein the transponder 112 is disposed upon a card member 406 which is positioned proximate to the transceiver circuitry 106. RF noncontact programming of the transponder 112 is permitted. When positioned proximate to the transceiver circuitry 106, the transponder 112 is powered by the transceiver transmit signal generated by the transceiver circuitry 106. When the transponder 112 is powered by the transceiver transmit signal generated by the transceiver circuitry 106, the transponder 112 is operative to generate a transponder signal for transmission to the transceiver circuitry 106. When the transceiver circuitry 106 receives the transponder signal generated by the transponder 112, a signal representative of the transponder signal is generated on line 134 for application to the signal identifier circuitry 130. The signal identifier circuitry 130 is operative in a manner as described previously.

A transceiver transmit signal control device 420 is further illustrated in the figure. The control device 420 is coupled to the transceiver circuitry 106 by line 426, shown in dash. The transceiver transmit signal control device 420 is representative of apparatus which may be utilized to generate signals for application to the transceiver circuitry 106 to cause the transceiver circuitry to generate a transceiver transmit signal of characteristics to cause access to the programmable memory 208 of the circuitry of the transducer 112 and also to provide a coded sequence to the transceiver circuitry 106 to form a portion of the transceiver transmit signal to be stored in the memory 208 of the circuitry of the transponder 112. The control device 420 is preferably software supported to be user friendly when used in a field programmable mode.

The flow diagram of FIG. 5 illustrates the method of operation of the programmable identification apparatus 100 shown in FIG. 1. First, and as indicated by block 506, the transceiver circuitry 106 generates the transceiver transmit signal 118 to the transponder 112. If the transceiver transmit signal 118, when received by the transponder, is above minimum energy levels, the transponder 112 is powered, as indicated by block 512.

A determination is made, as indicated by decision block 518, as to whether the transceiver transmit signal 118 received by the transponder 112 is of signal characteristics to cause only normal, identification operation of the transponder 112. If so, the yes branch is taken to block 524 and the coded signal stored in the programmable memory 208 is modulated. Then, the modulated signal is transmitted, as indicated by block 530.

If the no branch is taken from decision block 518, the transceiver transmit signal 118 may be of characteristics to cause access to the programmable memory 208. A determination is then made as to whether the transceiver transmit signal 118 is of signal characteristics to cause access to the programmable memory 208, as indicated by decision block 536. If so, the yes branch is taken, the contents of the programmable memory 208 are erased, as indicated by block 542, and the coded sequence forming a portion of the transceiver transmit signal 118 is stored in the programmable memory 208, as indicated by block 548. If the signal is not of the characteristics to permit access to the programmable memory 208, the no branch is taken from the decision block 536, and the transponder circuitry 512 is continued to be powered as long as the transceiver transmit signal 118 is beyond the threshold power levels.

FIG. 6 is a flow diagram listing the steps of a method, referred to generally by reference numeral 600, of an embodiment of the present invention. The method is for communication apparatus having a transceiver and a transponder.

First, and as indicated by block 606, a transceiver transmit signal is generated of either of at least first signal characteristics or second signal characteristics for transmission by the transceiver. Next, and as indicated by block 612, a first coded sequence of signal bits is stored in a programmable memory element of transponder circuitry of the transponder.

Next, and as indicated by block 618, the first coded sequence of signal bits stored in the programmable memory element of the transponder circuitry is modulated to form a transponder signal for transmission to the transceiver when the transceiver transmit signal is of the first signal characteristics.

Next, and as indicated by block 624, a second coded sequence of signal bits is stored in the programmable memory element when the transceiver transmit signal is of the second signal characteristics.

Use of the programmable identification apparatus 100 shown in FIG. 1 advantageously permits convenient customization of the transponder 112. As the coded sequence used to identify the transponder 112 is stored in the programmable memory 208, the coded sequence may be replaced with another coded sequence, when desired. And, as the coded sequence stored in the memory 208 may be replaced merely by applying a signal of certain characteristics to the transponder 112 by RF noncontact programming, customization of the transponder 112 is permitted at any time, and not only during assembly of the transponder.

Presently preferred embodiments of the present invention and many of its improvements have been described with a degree of particularity. The previous descriptions are of preferred examples for implementing the invention, and the scope of the invention should not necessarily be limited by this description. The scope of the present invention is defined by the following claims.

What is claimed is:

1. In an identification system having a transponder with a programmable memory that contains a coded-signal, and having a transceiver that is operable to generate a first transmit-signal for transmission to said transponder, whereupon said transponder operates to transmit a transponder-signal that is modulated in accordance with said coded-signal, apparatus for reprogramming said coded-signal comprising:

means in said transceiver selectively operable to generate a second transmit-signal;

said second transmit-signal comprising a carrier that is amplitude modulated to provide peak magnitudes that are indicative of a reprogram-coded-signal to be reprogrammed into said programmable memory;

transponder voltage-regulator means responsive to said second transmit-signal, said voltage-regulator means providing a regulated-voltage output in time-correspondence with said peak values;

transponder time-duration measuring means responsive to said regulated-voltage output, said time-duration measuring means providing an output in response to measuring a time-duration of said regulated-voltage output;

means connecting said output of said time-duration measuring means to said voltage-regulator to disable said voltage regulator, whereupon said voltage-regulator thereafter provides an unregulated-voltage output in time correspondence with said peak values of said second-transmit signal, said unregulated-voltage being indicative of said reprogram-coded-signal to be reprogrammed into said programmable memory;

transponder memory-access means enabled by said output of said time-duration measuring means, said memory-access means having a coded-signal input, and having an output connected to reprogram said programmable memory; and means connecting said unregulated-voltage output to said coded-signal input of said memory access control means.

2. The programmable identification apparatus of claim 1 wherein:

said transponder is powered by said transmit-signals transmitted thereto by said transceiver.

3. The programmable identification apparatus of claim 1 wherein:

said output of said time-duration measuring means results from said time-duration measuring means sensing a predetermined time during which said regulated-voltage is continuously generated by said voltage-regulator in time-correspondence with said peak values of said second transmit-signal.

4. The programmable identification apparatus of claim 1 wherein said time-duration measuring means comprises:

counter means for counting a predetermined number of regulated-voltage peaks generated in time-correspondence with said peak values of said second transmit-signal; and said counter means operating to generate said output when said predetermined number of said regulated-voltage peaks have been counted.

5. The programmable identification apparatus of claim 4 wherein:

said reprogram-coded-signal to be reprogrammed into said programmable memory is stored in said memory after said counter means output signal is generated, and in response to magnitudes of said unregulated-voltage.

6. The programmable identification apparatus of claim 4 wherein:

said programmable memory is write-protectable in response to said second transmit-signal.

7. An identification method for communication apparatus having a transceiver and a transponder, said method comprising the steps of:

selectively generating a first or a second amplitude modulated transmit-signal for transmission by said transceiver to said transponder;

storing a first coded signal in a programmable memory at said transponder;

using said first coded signal to form a transponder-signal for transmission to said transceiver when said first transmit-transmit signal is detected at said transponder;

clamping magnitudes of said second transmit-signal at said transponder when said second-transmit signal is detected at said transponder;

ceasing said clamping of magnitudes of said second transmit-signal in response to a given time duration of the detection of said clamped magnitudes of said second transmit-signal;

enabling said programmable memory element to store a second coded signal therein in response to said given time duration of said detection of said clamped magnitudes of said second transmit-signal; and using unclamped magnitudes of said second transmit-signal that occur after said given time duration to provide a second coded signal for storage in said programmable memory element.

8. In a transponder having a reprogrammable memory that stores a coded signal for use in generating a transponder-signal in response to said transponder receiving an interrogation signal from a transceiver, transponder apparatus for reprogramming said coded signal to a different coded signal in response to said transponder receiving an amplitude modulated carrier signal whose peak amplitudes contain information defining said different coded signal, said transponder apparatus comprising:

rectifier means for rectifying said amplitude modulated carrier signal;

voltage regulator means connected to said rectifier means and operable to clamp said peak amplitudes of said carrier signal and provide output pulses in response to each clamping event;

mode counter means connected to count said output pulses, and to provide an output upon a predetermined number of said output pulses being counted;

means connecting said mode counter means output to said voltage regulator means to disable said voltage regulator means, whereupon said voltage regulator means thereafter operates to provide an unregulated-voltage output that is representative of said peak amplitudes containing information defining said different coded signal;

memory access control means having an enable input, a coded signal input, and a coded signal output;

means connecting said mode counter means output to said enable input of said memory access control means;

means connecting said unregulated-voltage output to said coded signal input of said memory access control means; and means connecting said mode counter means coded signal output to said reprogrammable memory, to thereby reprogram said reprogrammable memory with said different coded signal.

* * * * *